United States Patent
Bi et al.

(10) Patent No.: US 8,630,625 B2
(45) Date of Patent: Jan. 14, 2014

(54) SYSTEM AND METHOD FOR PERSONALIZED MESSAGING

(75) Inventors: Xiaolian Bi, San Antonio, TX (US); Jason Unrein, San Antonio, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 897 days.

(21) Appl. No.: 11/855,388

(22) Filed: Sep. 14, 2007

(65) Prior Publication Data
US 2009/0077179 A1 Mar. 19, 2009

(51) Int. Cl.
*H04M 1/725* (2006.01)
*H04M 3/42* (2006.01)
*H04M 1/64* (2006.01)
*H04H 20/71* (2008.01)

(52) U.S. Cl.
USPC ............. 455/412.2; 455/414.1; 370/312; 379/88.17

(58) Field of Classification Search
USPC ........ 370/312; 455/412.2, 414.1; 379/88.17
See application file for complete search history.

(56) References Cited

U.S. PATENT DOCUMENTS

| | | | |
|---|---|---|---|
| 5,426,594 A | 6/1995 | Wright | |
| 5,787,151 A | 7/1998 | Nakatsu | |
| 6,288,319 B1 | 9/2001 | Catona | |
| 6,965,920 B2 * | 11/2005 | Pedersen | 709/206 |
| 2002/0087404 A1 * | 7/2002 | Silkey et al. | 705/14 |
| 2004/0143841 A1 * | 7/2004 | Wang et al. | 725/32 |
| 2004/0204135 A1 * | 10/2004 | Zhao et al. | 455/566 |
| 2005/0044082 A1 * | 2/2005 | Chande et al. | 707/10 |
| 2005/0169443 A1 * | 8/2005 | Rosenthal | 379/88.17 |
| 2006/0146995 A1 * | 7/2006 | Kim | 379/88.14 |
| 2007/0061421 A1 | 3/2007 | Karidi | |
| 2007/0073723 A1 | 3/2007 | Ramer | |
| 2007/0165554 A1 | 7/2007 | Jefferson | |
| 2008/0013471 A1 * | 1/2008 | Kim | 370/312 |
| 2010/0223314 A1 * | 9/2010 | Gadel et al. | 709/200 |

* cited by examiner

*Primary Examiner* — Kamran Afshar
*Assistant Examiner* — Omoniyi Obayanju
(74) *Attorney, Agent, or Firm* — Wolff & Samson, PC

(57) ABSTRACT

A system that incorporates teachings of the present disclosure may include, for example, a communication device having a controller to capture a voice recording, add the voice recording to a greeting to produce a personalized message, and deliver the personalized message upon scheduled delivery to at least one recipient based on a communication identifier of the at least one recipient, where the greeting includes at least one among audio, video, and image data, and where the communication device communicates with a notification server for creating the personalized message. Other embodiments are disclosed.

18 Claims, 6 Drawing Sheets

200

SYSTEM AND METHOD FOR PERSONALIZED MESSAGING

FIELD OF THE DISCLOSURE

The present disclosure relates generally to communication systems and more specifically to a system and method for personalizing messages.

BACKGROUND

Traditional greeting cards are generally delivered by standard mail. The greeting cards are typically paper based products on which textual greetings, or personal phrases are presented. The theme of a greeting card can relate to a special occasion, for example, "happy thoughts" for birthdays, "seasonal wishes" at Christmas, or "get well soon" wishes when a person is ill.

Rapid growth in electronic technology and consumer use of the Internet in the last decade has given birth to the electronic greeting card or E-card. Such E-cards can be purchased over the Internet, and delivered via email to an intended recipient. Sending an E-card generally requires access to a computer with Internet or email services.

DETAILED DESCRIPTION

In one embodiment of the present disclosure, a method can involve capturing a voice recording, adding the voice recording to a greeting to produce a personalized message, and delivering the personalized message upon scheduled delivery to at least one recipient based at least in part on at least one of a telephone number or a contact identifier associated with the at least one recipient, wherein the greeting comprises at least one among an image, a video, and a sound clip.

In one embodiment of the present disclosure, a notification server can have a controller to establish a connection with a communication device for creating a personalized message, propose greetings based on a user profile associated with the at least one recipient or the sender, and transmit the personalized message upon scheduled delivery to at least one specified recipient.

In one embodiment of the present disclosure, a communication device can have a controller to capture a voice recording, add the voice recording to a greeting to produce a personalized message, and deliver the personalized message to at least one recipient based on a communication identifier of the at least one recipient, where the greeting comprises at least one among audio, video, and image data, and wherein the communication device communicates with a notification server for creating the personalized message.

Figure 1:
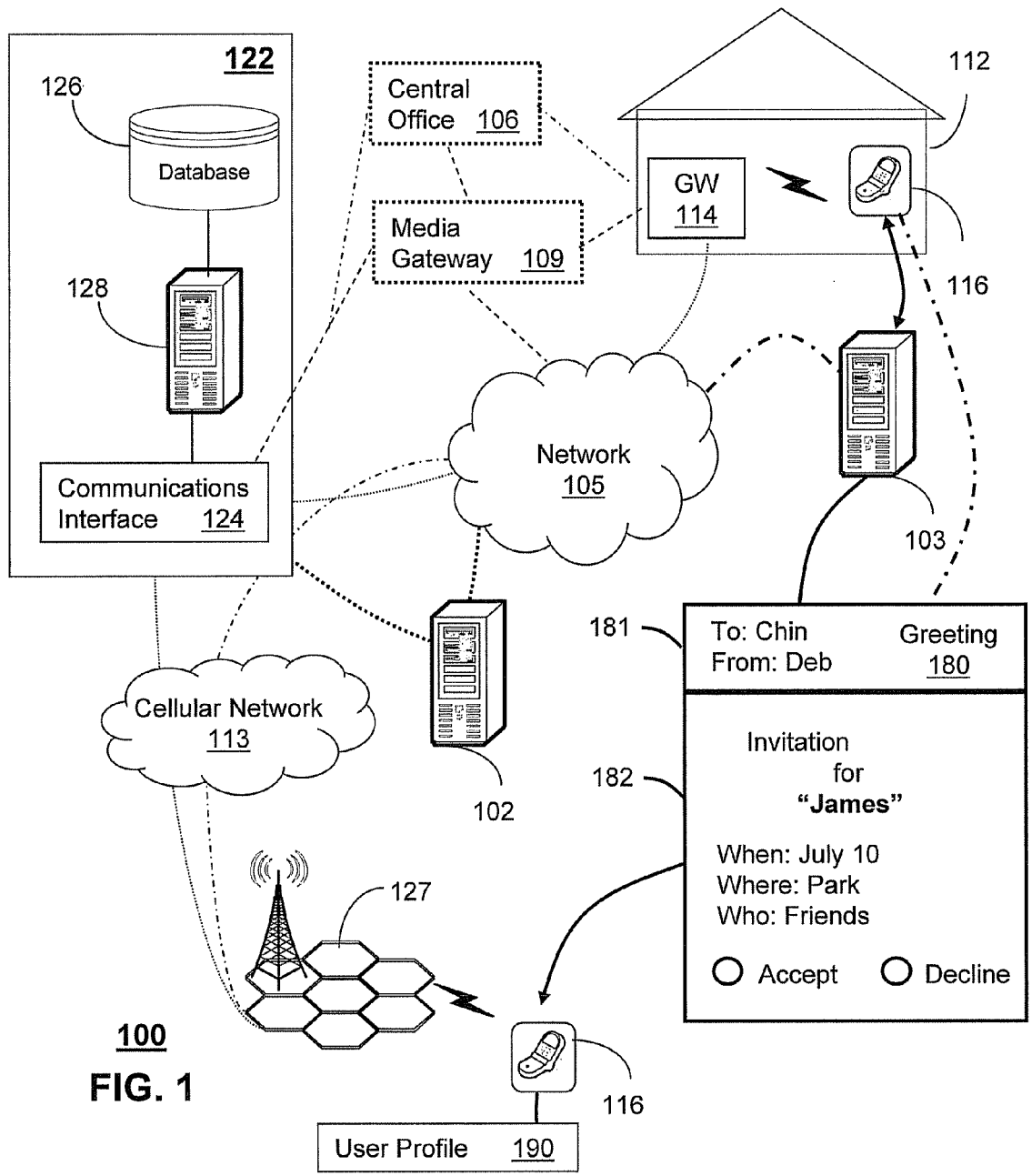
FIGS. 1-2 depict exemplary embodiments of a communication system.

FIG. 1 depicts an exemplary embodiment of a communication system 100 employing fixed and/or mobile communication devices 116 communicating by way of wired infrastructure with other communication devices and/or wireless access points (WAPs) and/or a network proxy or web server 122, which collectively operate in the communication system 100.

The communication device 116 can be a multimode communication device, such as a multimode VoIP terminal, cell phone, radio, portable music player, or any other mobile communication device. The present disclosure also contemplates the use of other types of communication devices, including other types of voice, video and data devices. The communication system 100 can comprise a packet-switched network 105 and a circuit-switched network such as the cellular network 113. The packet-switched network 105 can be an Internet Service Provider (ISP) network 105 that operates over Internet Protocol (IP). The network 105 can be coupled to the network proxy 122, the cellular network 113 and network elements located in one or more of the buildings 112 representing an enterprise or residence. The ISP network 105 utilizes technology for transporting Internet traffic.

A presence system 102 communicatively coupled to the network 105 and network proxy 122 can be utilized to track the whereabouts and status of a party communicating on one or more communication devices 116 in the communications system 100. Presence information derived from the presence system 102 can include a location of a party utilizing a communication device 116, the type of device used by the party (e.g., cell phone, PDA, home phone, home computer, etc.), and/or a status and availability of the party (e.g., busy, offline, actively on a call, actively engaged in instant messaging, etc.). The presence system 102 can perform the operations for parties who are subscribed to services of the presence system 102.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

A notification server 103 can administer sending of messages, such as, a personalized message 180 over the packet-switched network 105 and the cellular network 113 within the communication system 100. The notification server 103 can also manage aspects of creating and delivering the personalized message 180 in view of a user profile 190 associated with a communication device 116. The notification server can notify the communication device 116 to create a personalized message based on one or more dates in a calendar of the user profile 190, suggest greetings to include in the personalized message based on categories in the user profile 190, and send the personalized message to at least one specified recipient. Alternatively, the communication device 116 upon creating the personalized message with the notification server 103 can attempt to deliver the personalized message immediately upon scheduled request over the communication system 100 to the at least one recipient.

As an example, the personalized message 180 can include a header section 181 identifying a source and destination address, for example, a "to" and "from" entry. The personalized message 180 can also include a content section 182 providing at least one among image, video, text and a sound clip. The sound clip may be a song or a voice recording. As one example, the personalized message 180 can present a textual greeting with a voice message and/or song for a special occasion, as a "fun-gram". In another arrangement, the personalized message 180 may include only the voice message without the greeting or song, as a "voice-gram". A user operating the communication device 116 within the system 100 can create the personalized message 180 and send it to one or more recipients in the communication system 100 upon scheduled delivery.

Figure 2:
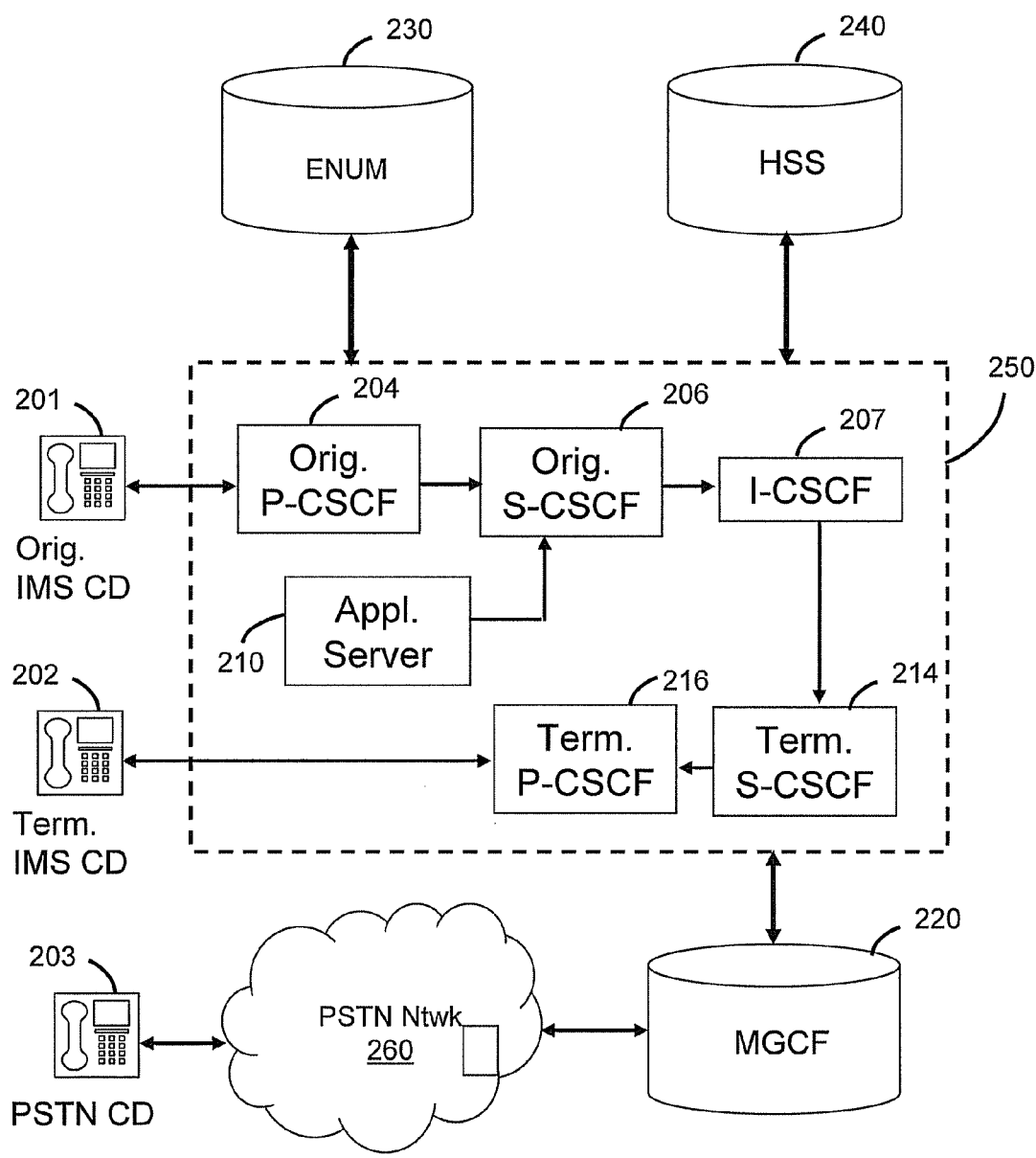

FIG. 2 depicts an exemplary embodiment of a communication system 200 employing a IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 or a Public Switched Telephone Network (PSTN) CD 203 using a Media Gateway Control Function (MGCF) 220 that connects the call through a common PSTN network 260. CDs 201-203 can be fixed, mobile, wireless and/or wired devices.

IMS CDs 201, 202 register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SEP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
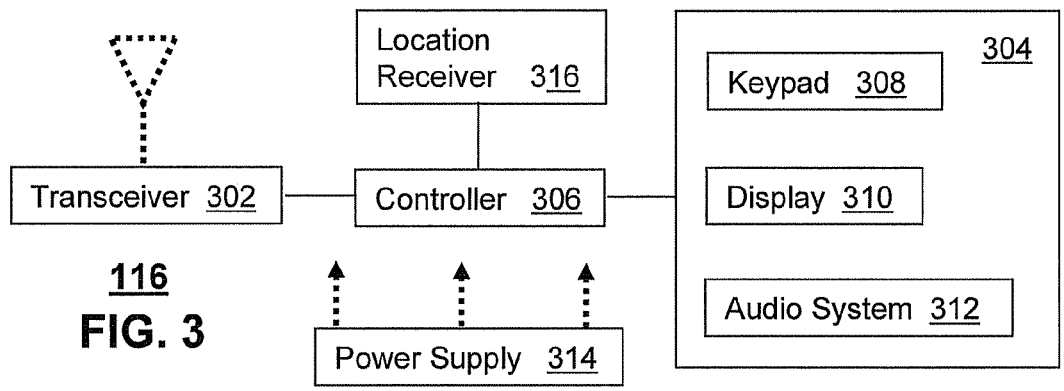
FIG. 3 depicts an exemplary embodiment of a mobile communication device.

FIG. 3 depicts an exemplary embodiment of the communication device 116. The communication device 116 can comprise a wired and/or wireless transceiver 302, a user interface (UI) 304, a power supply 314, a location receiver 316, and a controller 306 for managing operations thereof. In an embodiment where the communication device 116 operates in a landline environment, the transceiver 302 can utilize common wireline access technology to support POTS or VoIP services.

In a wireless communications setting, the transceiver 302 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing a public or private communication spectrum according to any number of communication protocols that can be dynamically downloaded over-the-air to the terminal device. It should be noted also that next generation wireless access technologies can be applied to the present disclosure.

The UI 304 can include a keypad 308 with depressible or touch sensitive navigation disk and keys for manipulating operations of the communication device 116. The UI 304 can further include a display 310 such as monochrome or color LCD (Liquid Crystal Display) for conveying images to the end user of the terminal device, and an audio system 312 that utilizes common audio technology for conveying and intercepting audible signals of the end user.

The power supply 314 can utilize common power management technologies such as replaceable batteries, supply regulation technologies, and charging system technologies for supplying energy to the components of the terminal device and to facilitate portable applications. In stationary applications, the power supply 314 can be modified so as to extract energy from a common wall outlet and thereby supply DC power to the components of the communication device 116.

The location receiver 316 can utilize common technology such as a common GPS (Global Positioning System) receiver that can intercept satellite signals and therefrom determine a location fix of the communication device 116.

The controller 306 can utilize computing technologies such as a microprocessor and/or digital signal processor (DSP) with associated storage memory such a Flash, ROM, RAM, SRAM, DRAM or other like technologies for controlling operations of the aforementioned components of the terminal device.

Figure 4:
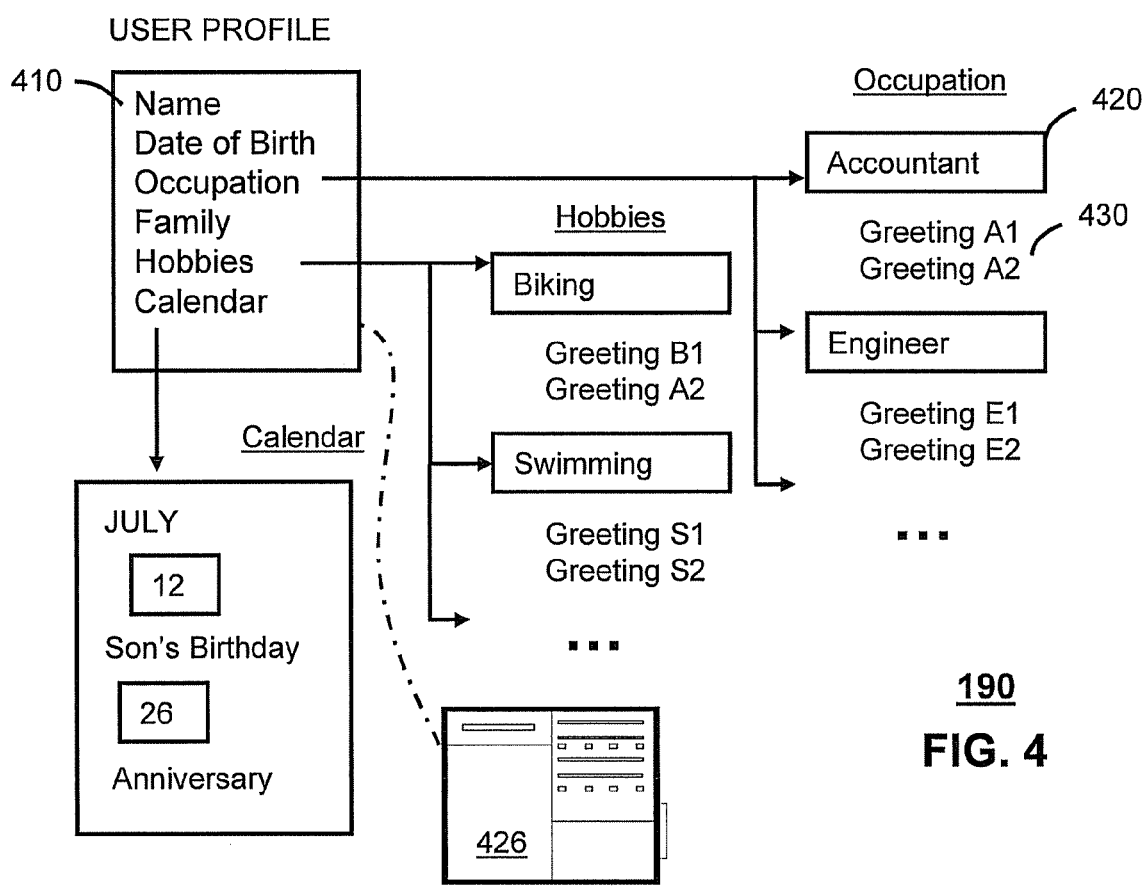
FIG. 4 depicts an exemplary user profile.

FIG. 4 depicts an exemplary user profile 190. The user profile 190 can be stored at least in part on a storage area network 426 which can be disposed within the communication system 100. As an example, the storage area network 426 can be communicatively linked to the notification server 103 (see FIG. 1). This allows the notification server 103 to provide the user profile 190, or information within the user profile 190, to various devices 116 within the communication systems 100 or 200, for example, to create personalized messages 180. The storage area network 426 can also store various information including user preferences, contact lists, calendars, recipient preferences, media content preferences, media content lists, and other information. The user profile 190 can be associated with the communication device of the at least one recipient or the sender of the personalized message 180.

The user profile 190 can include one or more categories 410 identifying personal information for one or more users operating communication devices 116 in the system 100 or system 200. As an example, the user profile 190 can identify a name, date of birth, occupation, family tree, and/or hobbies of the user. The user profile can be associated with the sender of the personalized message, or the at least one recipient. Although not shown, the user profile 190 can also identify favorite media content, such as songs, videos, or images. The user profile 190 can also contain a user accessible calendar identifying special dates. Sub-categories 420 of the user profile 190 can be associated with greetings 430 specific to a respective category. For example, if the user profile identifies an occupation of the user as an accountant, specific greetings for accounting theme greetings can be associated with the user. The specific greetings 430 can be linked in from the notification server 103 within the communication system 100 (see FIG. 1) from other network components. The user profile 190 can also contain other information regarding subscription information, telephone numbers, messenger identifiers, and billing account information.

Figure 5:
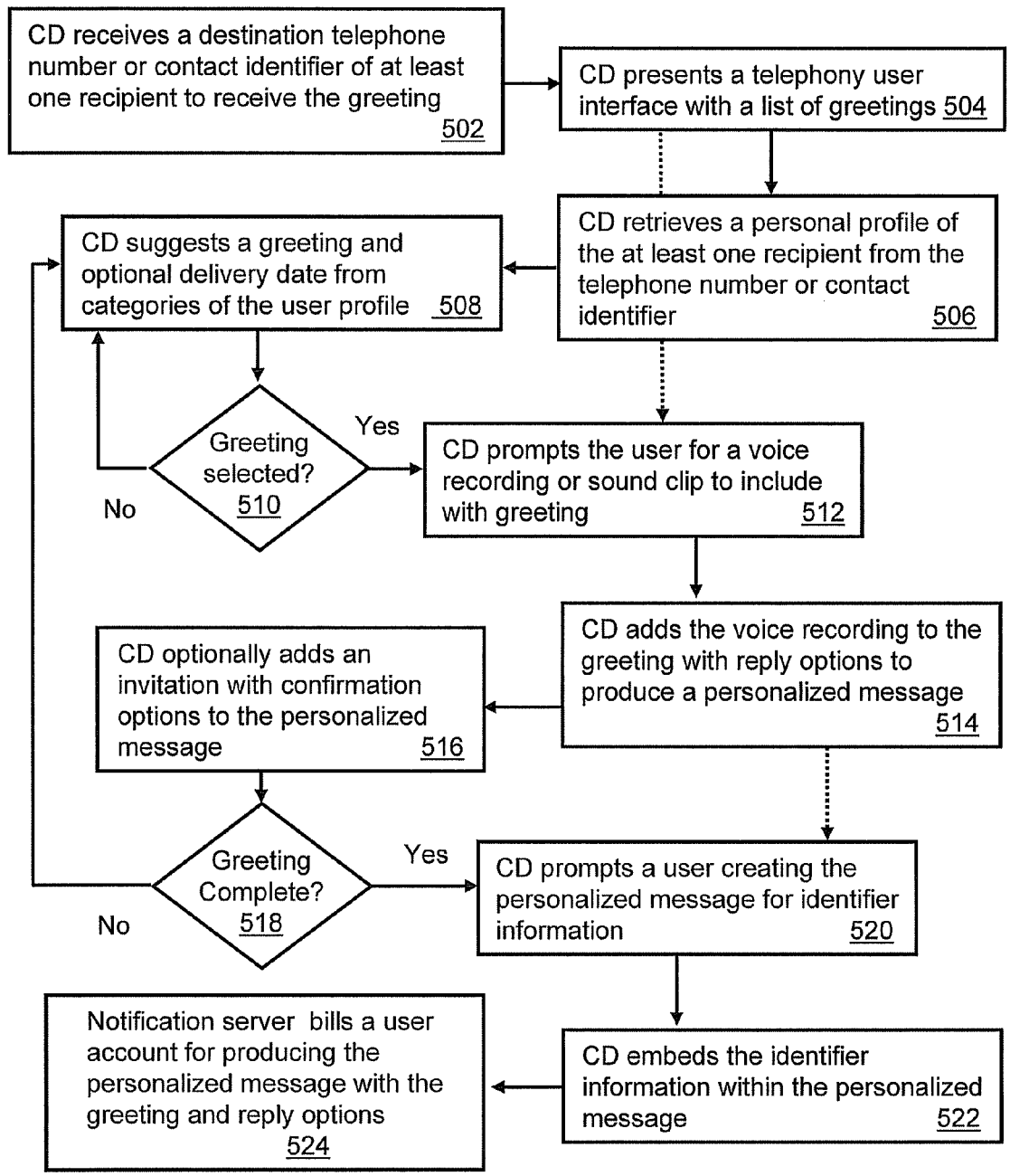
FIGS. 5-6 depict exemplary flow diagrams corresponding to methods operating in portions of the communication systems.

FIG. 5 depicts an exemplary method 500 operating in portions of the communication systems 100-200. Briefly, method 500 is directed to personalized message creation and delivery using a communication device (CD). It should be apparent to an artisan with ordinary skill in the art that other embodiments not depicted in FIG. 5 are also possible without departing from the scope of the claims described below. For convenience, the term communication system 100 as used in the following paragraphs can mean communication systems 100 and 200 singly or in combination.

Method 500 begins with step 502 in which the CD 116 can receive a destination telephone number or contact identifier of at least one recipient to receive a personalized message. For example, a user who desires to send a personalized message to an intended recipient can enter the intended recipient's phone number, messenger name, or other identifier into the communication device 116. Upon entering the telephone number or contact identifier, the CD 116 at step 504 can present a telephony user interface, for example, on display 310 with a list of greetings. The greetings can be standard greetings stored locally on the CD 116 or received remotely from the notification server 103. A greeting can be a text phrase, video clip, sound clip, or any other suitable media greeting. As an example, a greeting can be a "happy birthday wishes", "congratulations", or any other greeting phrase.

The telephony user interface allows the user to select from one or more available greetings which can be customized to the intended recipient. At this point, it should be noted that the method 500 can proceed to intermediate step 506, or directly to step 512 as denoted by the dashed line. At step 506, the CD 116 can retrieve a user profile 190 of the at least one recipient from the telephone number or contact identifier. As an example, the notification server 103 upon receiving a directive from the CD 116 can access the user profile 190 within the storage area network 426. As previously noted, the user profile 190 contains personal information which can be evaluated for selecting a greeting. The user profile can be that of the sender or the intended recipient. The notification server 103 can filter the greetings presented in the telephony user interface based on categories 410, sub-categories 420, and greeting themes 430 in the user profile.

At step 508, the CD 116 can suggest a personalized message and delivery date from categories of the user profile. For example, referring back to FIG. 4, if the user profile 190 identifies the intended recipient as an accountant, the notification server 103 can select from a list of greetings themes 430 associated with accounting. The greeting themes 430, in this example, may be actual greetings, or key words used for describing accounting practices, and which can be used for searching a greeting in a network database. The notification server 103 can further filter the greetings based on a calendar of the intended recipient. For example, the notification server 103 can determine if the personalized message is directed to a birthday, and based on the calendar propose a delivery date corresponding to the birthday. In one arrangement, the notification server 103 can notify the user to create a personalized message before a specific date, such as a birthday. As another example, the notification server 103 can customize the greeting to a hobby, for example, by including images of bicycles or audio clips related to biking if the user profile 190 lists bicycling as a user hobby.

Returning back to FIG. 5, if a greeting is not selected at step 510, the CD 116 can continue to propose greetings or further customize the greeting back at step 508. When at step 510 the user selects a greeting from the telephony user interface, the CD 116 can then prompt the user for a voice recording or sound clip, such as a song, to include with greeting, as shown at step 512. The voice recording allows the user creating the personal message to voice a personal statement, for example, a personal happy birthday wish. At step 514, the CD 116 can add the voice recording, or media content, to the greeting with reply options to produce a personalized message. The voice recording can be directly added to the greeting, or as an attached sound file.

The CD 116 can also optionally add an invitation with confirmation options to the personalized message at step 516. For example, referring back to FIG. 1, the personalized message 180 can include an accept or decline option to which the intended recipient can respond. The reply option can be a visual indicator, such as a radio box for accepting or declining the invitation, or an audible message, such as a spoken phrase asking the intended recipient for a response. For example, the CD 116 can include a text-to-speech system to produce a spoken reply option, and a speech recognizer to determine responsive to a spoken utterance if the intended recipient accepts or declines the invitation.

In one arrangement, during the creation of the personalized message 180, the notification server 103 can open a temporary connection with the communication device 116 for creating the personalized message 180. In particular, the temporary connection can allow the notification server 103 to communicate information within the user profile 190 to the CD 116. The temporary connection can also allow the notification server 103 to provide video, audio, and text data, in addition to presence information, for inclusion with the personalized message 180. During the temporary connection, the notification server 103 can suggest greetings based on the user profile 190 of the at least one recipient. After the personalized message has been created, the CD 116 or the notification server 103 can then close the temporary connection.

The telephony user interface can also allow the user to review the personalized message 180. For example, the same telephony user interface which allows the user to capture a voice recording and select a media content, can allow the user to listen to, visualize, and review the personalized message 180. Furthermore, upon creating the personalized message, the user can preview it in a same media environment as the intended recipient. For example, presence information gathered from the user profile can identify media types which the recipient device supports. The personalized message can be configured to a format acceptable by the targeted recipient device. For example, the CD 116 or notification server 103 can reformat a .MP3 sound clip included in the personalized message 180 to a .WAV format if the recipient device only accepts the .WAV format as specified by the presence information.

Returning back to FIG. 5, if at step 518 the user has not completed the personalized message, the CD 116 can proceed back to step 508 to suggest other greetings. When the user has completed the personalized message at step 518, CD 116 can prompt the user creating the personalized message for identifier information at step 520. The identifier information can be the user's name or any other identifier information, such as a telephone number, subscriber account, or messenger name of the user creating the personalized message 180. At step 522, the CD 116 can embed the identifier information within the personalized message to identify the user creating and sending of the personalized message 180. At this step, the notification server 103 and CD 116 can schedule a delivery of the personalized message 180, for example, based on a date in the user profile 190.

At step 524, upon scheduling or delivery of the personalized message 180, the notification server 103 can bill a user account for producing the personalized message. The notification server 103 can also include charges associated with minutes used during the temporary connection. The notification server 103 can further bill the user account if reply options were included with the personalized message 180. For example, the notification server 103 can charge the user for services rendered (e.g., presence status, user profile information, and media content) in creating the personalized messages in addition to charges associated with processing reply options.

Figure 6:
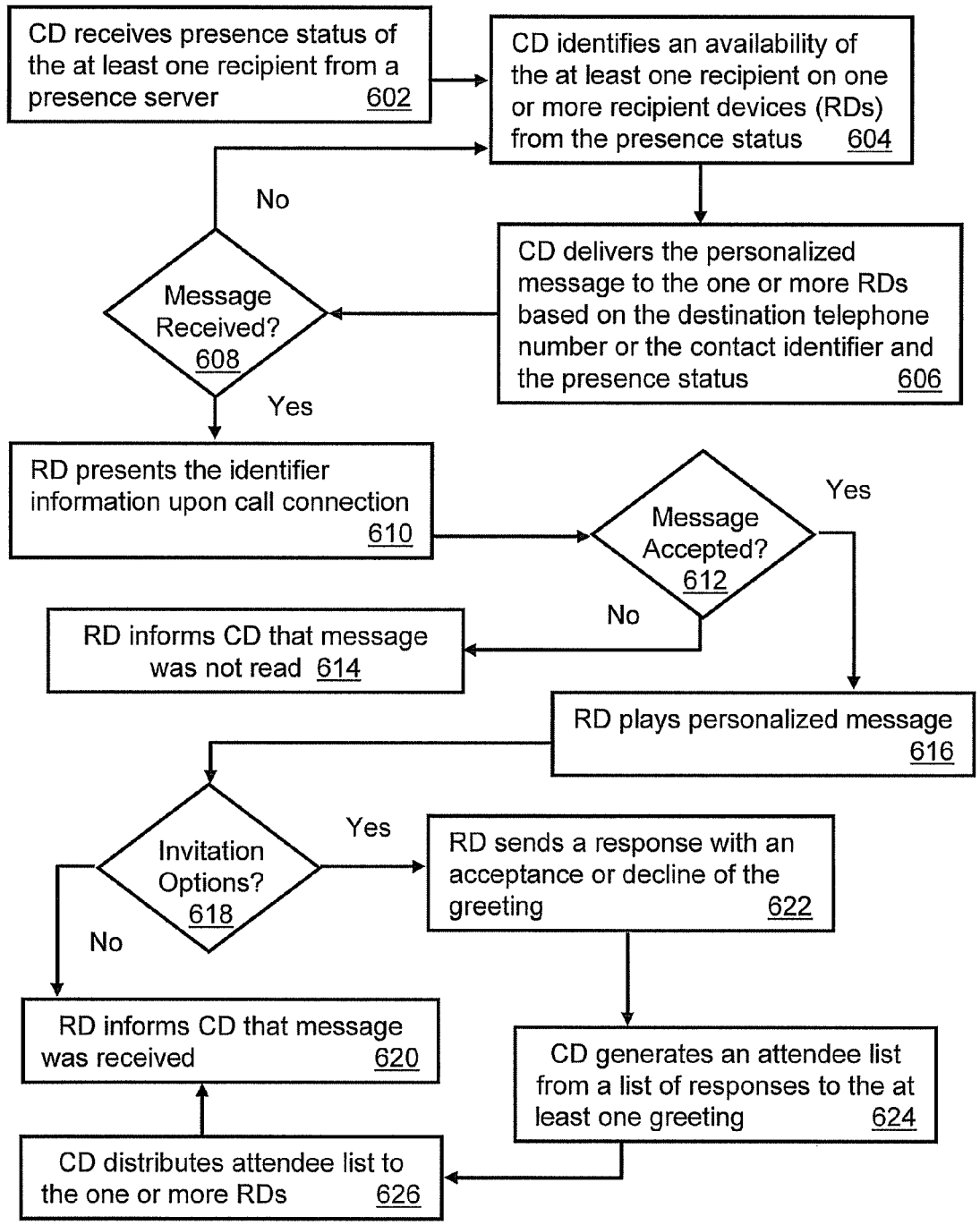

FIG. 6 depicts an exemplary method 600 operating in portions of the communication systems 100-200. Briefly, method 600 is directed to sending personalized messages 180. The method 600 can start in a state, for example, wherein a user has created a personalized message 180 and identified an intended recipient, for example, in accordance with method 500.

At step 602, the CD 116 can receive presence status of the at least one intended recipient from a presence server. As an example, the notification server 103 can contact the presence server 102 for presence information associated with the intended recipient. The CD 116 can identify an availability of the at least one recipient on one or more recipient devices (RDs) 116 from the presence status as shown in step 604. The presence status can identify which RDs 116 the intended recipient is currently operating, or available on, to receive the personalized message 180, and a priority order for the one or more RDs. For example, presence status may indicate that the intended recipient is currently on-line using a laptop device, and is available secondly on a mobile cell phone to receive a personalized message.

At step 606, the CD 116 can deliver the personalized message to the one or more RDs based on the destination telephone number, the contact identifier, and/or the presence status. Recall, the destination telephone number and/or contact identifier of the intended recipient can be provided by the user in step 502 during the creation of the personalized message 180. The notification server 103 upon receiving the contact information can send the personalized message to the at least one intended recipient. It should be noted that the communication device 116 can attempt to deliver the personalized message immediately to the at least one intended recipient, thereby bypassing the notification server 103.

Returning back to FIG. 6, if at step 608, the message is not received, the method can proceed back to step 604 at which the CD identifies the availability of the intended recipient on other devices. If however at step 608 the personalized message 180 sent to the at least one intended recipient is received, the RD handled by the intended recipient can present the identifier information upon call connection as shown in step

610. As an example, the RD can retrieve the contact information embedded within the header of the personalized message 180. The RD can then display the name of the user that created and sent the personalized message 180 on a user interface to allow the intended recipient to identify who sent the message.

If at step 612, the intended recipient accepts the message in view of the identified sender, the RD can play the personalized message 180, as shown at step 616. If the intended recipient does not accept the message, the RD informs the CD 116 that the personalized message was not read at step 614. Notably, the personalized message 180 can include a voice message created by the sending user with an appended media content, such as a song or video clip, in addition to a greeting. The personalized message 180 can also automatically pre-append the name of the intended recipient to further personalize the message, for example, via text-to-speech synthesis from information gathered from the user profile 190 during creation of the personalized message 180.

If at step 618 reply options (see 180, FIG. 1) are not presented within the personalized message 180, and the personalized message was successfully delivered, the RD can inform the CD that the message was received at step 620. If reply options are presented at step 618, the intended recipient can respond to the personalized message 180. For example, the intended recipient upon receiving the personalized message 180 may accept or reject the invitation. As shown in step 622, the RD can send at least one reply that identifies an acceptance or decline of the invitation. Notably, the invitation can be sent to multiple recipients who can selectively respond to the invitation.

At step 624, the CD can generate an attendee list from a list of responses received. As an example, the notification server 103 can collect responses from a plurality of recipients and send a confirmation list to the CD 116 identifying those recipients accepting or declining the invitation. At step 626, the CD 116 can optionally distribute the attendee list to the one or more RDs to allow the one or more recipients to see a list of confirmed attendees. The RD can also confirm that the message was received, as shown at step 620.

Upon reviewing the aforementioned embodiments, it would be evident to an artisan with ordinary skill in the art that said embodiments can be modified, reduced, or enhanced without departing from the scope and spirit of the claims described below. For example, the notification server 103 can communicate with a set-top box (STB) in the communication system 100 or other device to retrieve a user profile 190 responsive to a user request. The notification server 103, through the STB, can allow users to share and exchange personal information within user profiles. As an example, the STB can share linked-in network contacts presented in the user profiles. The STB can also present a list of media favorites, most frequently accessed media (e.g. videos, images, pictures, songs), and a history of accessed media. These media favorites can be linked into the user profile 190 and associated with one or more specific greeting themes 430. The STB, based on user permissions and allowances, can also establish policies for sharing access to personal information and media content identified in the user profiles. As another example, a user can create and send a personalized message from a web interface of the STB, which can be delivered to one or more recipient communication devices. In yet another example, the personalized message can include a special ring-tone command which requires the recipient device to play a specific ring-tone prior to delivering the message.

These are but a few examples of modifications that can be applied to the present disclosure without departing from the scope of the claims. Accordingly, the reader is directed to the claims section for a fuller understanding of the breadth and scope of the present disclosure.

Figure 7:
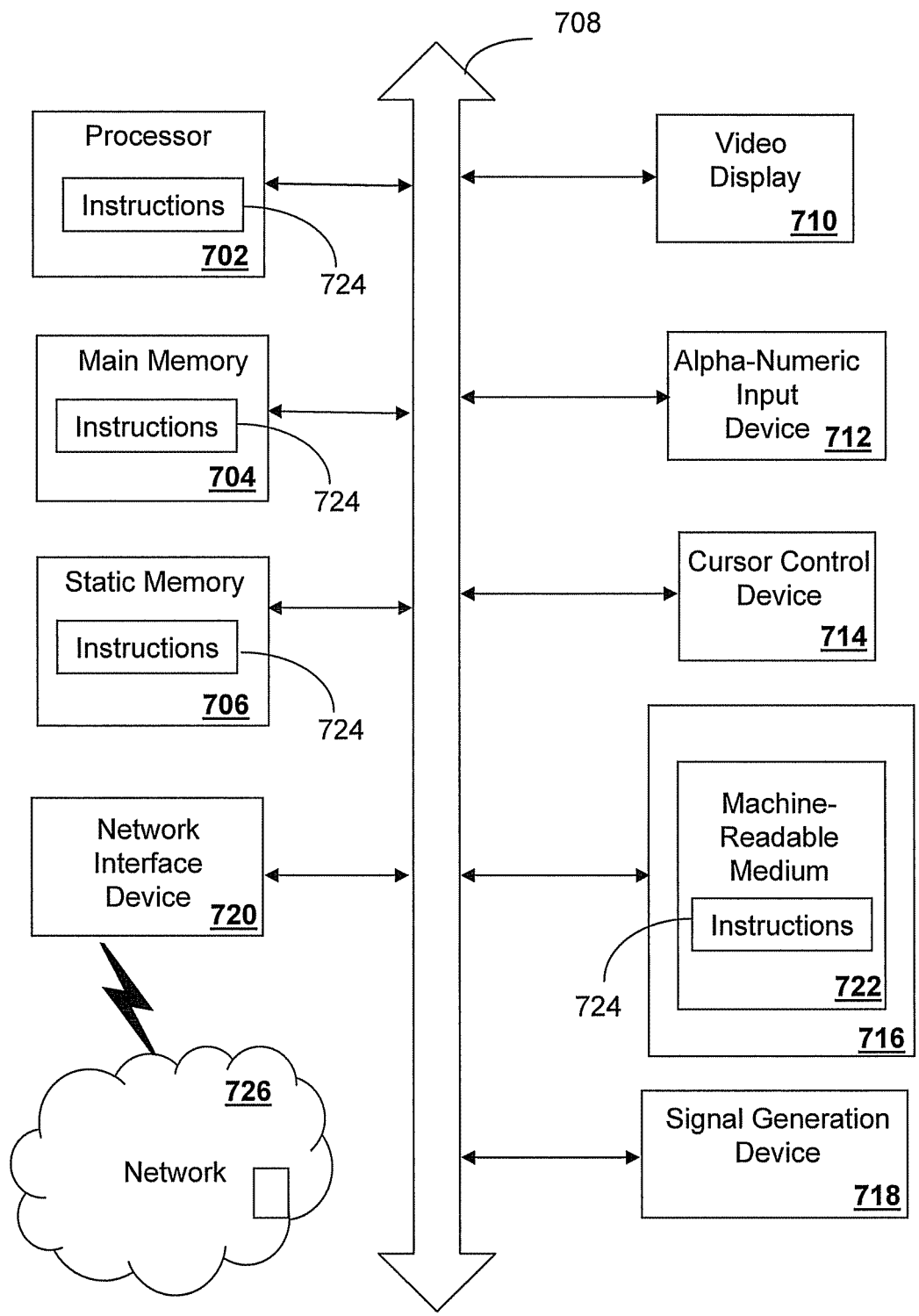
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a mass storage medium 716, a signal generation device 718 (e.g., a speaker or remote control) and a network interface device 720.

The mass storage medium 716 may include a computer-readable storage medium 722 on which is stored one or more sets of instructions (e.g., software 724) embodying any one or more of the methodologies or functions described herein, including those methods illustrated above. The computer-readable storage medium 722 can be an electromechanical medium such as a common disk drive, or a mass storage medium with no moving parts such as Flash or like non-volatile memories. The instructions 724 may also reside, completely or at least partially, within the main memory 704, the static memory 706, and/or within the processor 702 during execution thereof by the computer system 700. The main memory 704 and the processor 702 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the computer-readable storage medium 722 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
obtaining a profile of a recipient selected by a user;
accessing a plurality of pre-stored greetings that are not generated by the user and are related to a category specified in the profile of the recipient;
filtering the plurality of pre-stored greetings based on the category specified and on calendar information in the profile of the recipient to identify a pre-stored greeting not generated by the user;
suggesting to the user the pre-stored greeting and a delivery date determined based on the calendar information in the profile of the recipient;
receiving a selection from the user of the pre-stored greeting;
in response to receiving the selection, prompting the user to provide a voice recording;
capturing the voice recording;
adding the voice recording to the pre-stored greeting to produce a personalized message;
determining a presence status of the recipient; and
delivering the personalized message to the recipient in accordance with the presence status and the calendar information stored in the profile, wherein the selected pre-stored greeting comprises one among an image, a video, and a sound clip and wherein the presence status identifies an availability of the recipient and a priority order for communicating on recipient devices.

2. The method of claim 1, further comprising:
billing a user account for producing the personalized message with the pre-stored greeting.

3. The method of claim 1, further comprising:
adding an invitation with reply options to the personalized message;
receiving a reply to the personalized message that identifies an acceptance or decline of the invitation; and generating and distributing an attendee list based on the reply, wherein the reply options comprise one among confirmation status and delivery status.

4. The method of claim 1, further comprising:
establishing communication with the recipient according to a communication identifier of the recipient; and
playing the personalized message upon establishing communications.

5. The method of claim 1, wherein the information indicates one among a date of birth, occupation, family, hobby, education, contact list, and calendar.

6. The method of claim 5, further comprising:
prompting a user creating the personalized message for identifier information;
embedding the identifier information within the personalized message; and
presenting the identifier information upon establishing communication with the recipient before delivering the personalized message.

7. A notification server, comprising:
a memory storing computer program instructions; and
a processor configured to execute the computer program instructions which, when executed on the processor, cause the processor to perform operations comprising:
establishing a connection with a communication device for creating a personalized message;
obtaining a profile of a recipient selected by a user;
accessing a plurality of pre-stored greetings that are not generated by the user and are related to a category specified in the profile of the recipient;
filtering the plurality of pre-stored greetings based on the category specified and on calendar information in the profile of the recipient to identify a pre-stored greeting not generated by the user;
suggesting to the user the pre-stored greeting not generated by the user and a delivery date determined based on the calendar information stored in the profile of the recipient;
receiving a selection from the user of the pre-stored greeting;
prompting the user to provide a voice recording, in response to receipt of the selection;
obtaining the voice recording;
adding the voice recording to the pre-stored greeting to produce a personalized message;
determining a presence status of the recipient; and
transmitting the personalized message comprising the pre-stored greeting and the voice recording, in accordance with the presence status and the calendar information in the profile, to the recipient, wherein the presence status identifies an availability of the recipient and a priority order for communicating on recipient devices.

8. The notification server of claim 7, wherein the operations further comprise:
appending an invitation to the pre-stored greeting;
including reply options with the selected pre-stored greeting; and
generating an attendee list based on replies confirming an accept or decline of the invitation responsive to sending the personalized message.

9. The notification server of claim 7, wherein the operations further comprise:
operating according to one among a circuit-switched standard and a packet-switched standard for transmitting the personalized message,
wherein the circuit-switched standard comprises one among a cellular telephony standard, and a Public Switched Telephone Network standard, and
wherein the packet-switched standard comprises one among a Voice over Internet Protocol standard, and a video Internet Protocol telephony standard.

10. A communication device comprising a controller to:
obtain a profile of a recipient selected by a user;
access a plurality of pre-stored greetings that are not generated by the user and are related to a category specified in the profile of the recipient;
filter the plurality of pre-stored greetings based the category specified and on calendar information in the profile of the recipient to identify a pre-stored greeting not generated by the user;
suggest to the user the pre-stored greeting and a delivery date determined based on the calendar information in the profile of the recipient;
receive a selection from the user of the pre-stored greeting;
prompt the user to provide a voice recording, in response to receipt of the selection;
capture the voice recording;
add the voice recording to the pre-stored greeting to produce a personalized message;
determine a presence status of the recipient; and
deliver the personalized message to a recipient in accordance with the presence status and the calendar information stored in the profile, wherein the pre-stored greeting comprises one among audio, video, and image data, and wherein the communication device communicates with a notification server for creating the personalized message and wherein the presence status identifies an availability of the recipient and a priority order for communicating on recipient devices.

11. The communication device of claim 10, wherein the controller is adapted to:
prompt the user to record the voice message, and present the personalized message for review prior to sending.

12. The communication device of claim 10, wherein a presence server is communicatively coupled to the notification server to identify the availability of the recipient on recipient communication devices.

13. The communication device of claim 10, wherein the notification server retrieves the profile associated with the recipient based on a destination telephone number or contact identifier, and suggests the delivery date for the personalized message based on a category of the profile.

14. The communication device of claim 10, wherein the controller of the communication device is adapted to communicate the personalized message over one of a wired and wireless communication link.

15. The communication device of claim 10, wherein the notification server receives a reply to an invitation in the greeting identifying an acceptance or decline of the invitation, generates an attendee list based on the reply, and sends the attendee list to the communication device.

16. The communication device of claim 15, wherein the notification server forwards the attendee list to recipients of the personalized message.

17. The communication device of claim 15, wherein the notification server receives identifier information from the user creating the personalized message, and embeds the identifier information within the personalized message to be presented upon establishing communication with the recipient before presenting the personalized message.

18. The communication device of claim 17, wherein the notification server bills a user account based on the identifier information for creating the personalized message.

\* \* \* \* \*